F. G. BEETEM.
BINDING POST.
APPLICATION FILED FEB. 6, 1919.
1,346,525. Patented July 13, 1920.
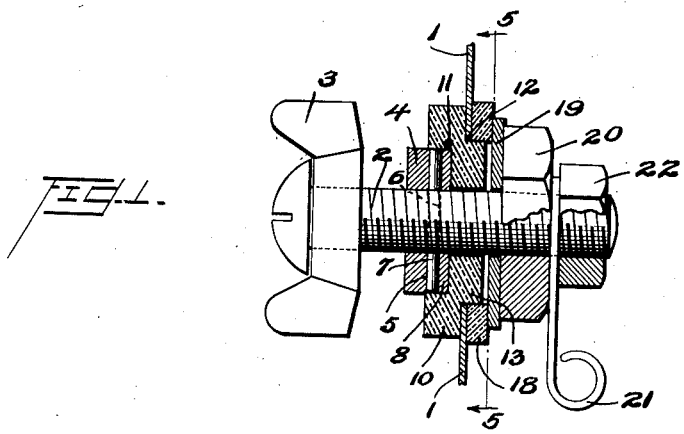
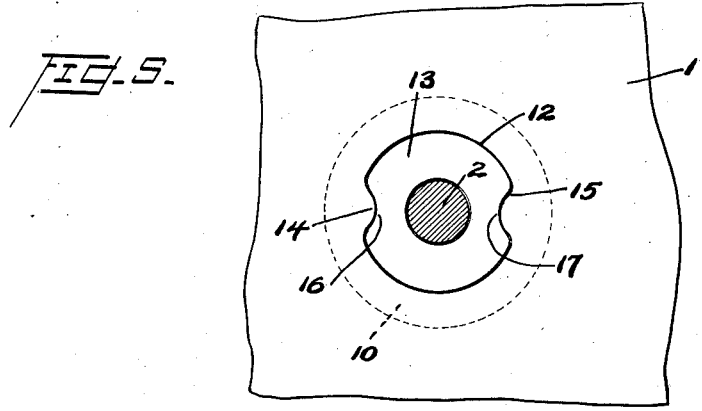
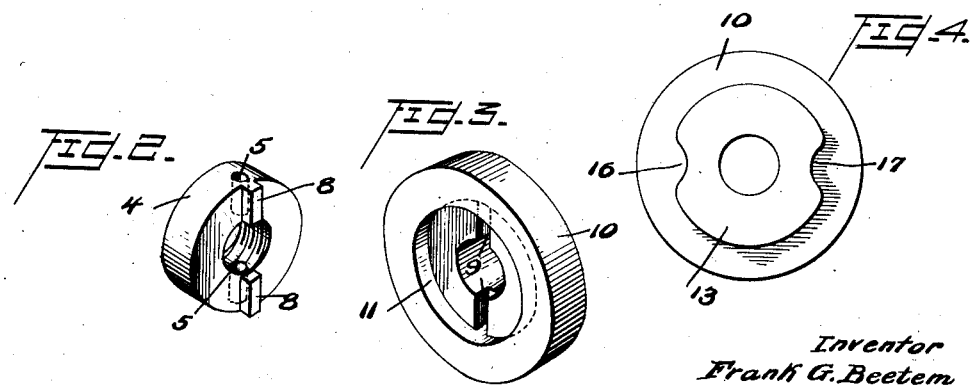
Inventor
Frank G. Beetem
By
His Att'y

UNITED STATES PATENT OFFICE.

FRANK G. BEETEM, OF WASHINGTON, DISTRICT OF COLUMBIA.

BINDING-POST.

1,346,525.  Specification of Letters Patent.  Patented July 13, 1920.

Application filed February 6, 1919. Serial No. 275,348.

*To all whom it may concern:*

Be it known that I, FRANK G. BEETEM, a citizen of the United States, residing at Washington, District of Columbia, have invented certain new and useful Improvements in Binding-Posts, of which the following is a specification.

This invention relates to binding-posts, and has for its object the construction of a binding-post having at both ends means for attaching the circuit wires thereto and detaching the same therefrom without disturbing the means which secure the post to its support.

Another object is to provide a device so constructed that when once properly secured in place, it cannot either rotate in or work out of its support.

To these ends the invention consists in the combination of parts and details of construction more fully hereinafter disclosed, and particularly pointed out in the claim.

Referring to the accompanying drawing wherein the numerals indicate like parts in all the views:—

Figure 1, is a section taken through the binding-post after the same has been secured on its support, Fig. 2, a perspective of the specially constructed nut used on the binding-post, Fig. 3, a perspective of an insulating washer adapted to coöperate with the nut shown in Fig. 2 and the binding-post support, Fig. 4, a plan view of the same washer, showing the rear face thereof, and Fig. 5, a section taken on line 5—5 of Fig. 1, with the insulating washer on that side of the support removed.

The binding-post proper will be described in the order of its assembly, first noting that it is mounted on a wall or support 1, from which it must be insulated. The headed bolt or screw 2 carries the wing nut 3 which is screwed on close to the head of the bolt. A nut 4 having a hole 5 running diametrically through the same is then screwed on bolt 2 which is provided with a corresponding hole 6. When the nut and bolt are in such position that these holes coincide, a transverse pin 7 is placed therein and the bolt 2 and nut 4 thus secured together. Nut 4 is provided on one face with a transverse tongue 8 adapted to engage with the transverse groove 9 of insulating washer 10 which latter is placed on the bolt adjacent nut 4. This tongue and groove arrangement secures the washer 10 against rotation, nut 4 being non-rotative on bolt 2. The face of washer 10 provided with groove 9, is recessed so as to form a shoulder 11. This shoulder 11 engages the ends of pin 7 and holds the latter in place when washer 10 is placed on bolt 2 adjacent nut 4. Thus assembled, the parts are put on the support 1. The support is provided with a hole 12 of the shape shown in Fig. 5. The other face of washer 10 is provided with a projecting portion 13 of approximately the same size and shape as opening 12 in the support into which it fits, projections 14, 15 of the support registering with notches 16, 17 of the washer, and thus preventing relative rotative movement of the parts.

The plain ring 18 of insulating material is next placed on the bolt 2, thus completing the insulation of the binding-post part from the support 1.

Washer 19 is then put in place, and secured by nut 20, which when screwed up secures the various parts in place on the support. Conductor terminal 21 follows and is held in place by nut 22, which latter also acts as a lock nut on nut 20.

It will be observed that with the construction described, the bolt 2 is rigidly secured from turning relative to its support by reason of pin 7 connecting nut 4 to bolt 2, tongue 8 and groove 9 connecting nut 4 to washer 10, and projections 14 and 15 engaging notches 16 and 17, all being held in place by nut 20 on the opposite side of the support. Thus, the wire or conductor-terminal engaging nuts 3 and 22 may be manipulated to secure or remove circuit conductors without disturbing the bolt 2 which serves as a conductor through the support.

The use of a headed member such as bolt 2, prevents the accidental loss or detachment of wing nut 3 as is often the case with nuts of binding-posts, and provides an arrangement whereby the nut cannot be removed even with the roughest usage.

This invention is not confined to the specific details of construction, nor limited to the employment of all the elements shown and described except as pointed out in the claim.

What I claim is:

A binding-post consisting of a centrally apertured insulating member having a reduced portion on one side thereof adapted to project through the opening in the binding-post support, notches in the periphery of said reduced portion adapted to engage projections in said support opening, a nut adjacent the other face of said insulating member, means connecting said nut and insulating member, an insulating washer adapted to fit on the reduced portion of said insulating member, a bolt extending through all of said members and the support, means connecting said nut to the bolt, said connecting means being held in place by said first mentioned insulating member, means on said bolt for drawing said insulating members into clamping engagement with the support, and conductor-engaging means on said bolt.

In testimony whereof I have affixed my signature.

FRANK G. BEETEM.